United States Patent
Peiffer et al.

(12)
(10) Patent No.: US 6,423,401 B2
(45) Date of Patent: Jul. 23, 2002

(54) SEALABLE, BIAXIALLY ORIENTED POLYESTER FILM

(75) Inventors: Herbert Peiffer, Mainz; Richard Lee Davis, Wiesbaden; Gottfried Hilkert, Saulheim, all of (DE)

(73) Assignee: Mitsubishi Polyester Film GmbH (DE)

(*) Notice: Subject to any disclaimer, the term of this patent is extended or adjusted under 35 U.S.C. 154(b) by 0 days.

(21) Appl. No.: 09/818,878

(22) Filed: Mar. 27, 2001

(30) Foreign Application Priority Data

Mar. 29, 2000 (DE) .......................... 100 15 633

(51) Int. Cl.⁷ .................. B32B 27/08; B32B 27/20; B32B 27/36; B32B 31/16; B32B 31/30
(52) U.S. Cl. ................. 428/216; 428/215; 428/323; 428/327; 428/346; 428/347; 428/349; 428/354; 428/480; 428/910; 428/141; 264/173.1; 264/173.12; 264/173.15; 264/288.4; 264/289.3; 264/290.2
(58) Field of Search ................ 428/141, 213, 428/215, 216, 323, 327, 343, 346, 347, 349, 354, 480, 910; 264/173.1, 173.12, 173.15, 288.4, 289.3, 290.2

(56) References Cited

U.S. PATENT DOCUMENTS

| | | | | |
|---|---|---|---|---|
| 6,194,054 B1 | * | 2/2001 | Peiffer et al. | 428/141 |
| 6,214,440 B1 | * | 4/2001 | Peiffer et al. | 156/244.24 |
| 6,261,663 B1 | * | 7/2001 | Peiffer et al. | 264/288.4 |
| 6,291,053 B1 | * | 9/2001 | Peiffer et al. | 264/172.19 |

FOREIGN PATENT DOCUMENTS

| | | |
|---|---|---|
| EP | 0 035 835 | 9/1981 |
| EP | 0 432 886 | 6/1991 |
| EP | 0 515 096 | 11/1992 |
| GB | 1 465 973 | 3/1977 |
| WO | WO98/06575 | 2/1998 |

* cited by examiner

*Primary Examiner*—Vivian Chen
(74) *Attorney, Agent, or Firm*—ProPat, L.L.C.

(57) ABSTRACT

The invention relates to a biaxially oriented, sealable polyester film with at least a base layer (B), with a sealable outer layer (A) and with another, nonsealable outer layer (C), where the sealable outer layer (A) has a minimum sealing temperature of not more than 110° C. and a seal seam strength of at least 1.3 N/15 mm of film width, and the topographies of the two outer layers (A) and (C) have particular characterizing features. The film of the invention is particularly suitable for use in flexible packaging and specifically in particular for use on high-speed packaging machinery.

11 Claims, No Drawings

SEALABLE, BIAXIALLY ORIENTED POLYESTER FILM

The invention relates to a transparent, sealable, coextruded, biaxially oriented polyester film composed of at least a base layer (B) and, applied to the two sides of this base layer, outer layers (A) and (C). The invention also relates to the use of the film, and to a process for its production.

BACKGROUND OF THE INVENTION

Sealable, biaxially oriented polyester films are known in the prior art. These known prior art films either have good sealing performance or good optical properties or acceptable processing performance.

GB-A 1 465 973 describes a coextruded, two-layer polyester film, one layer of which is composed of copolyesters containing isophthalic and terephthalic acids and the other layer of which is composed of polyethylene terephthalate. No useful information is given in the specification concerning the sealing performance of the film. Due to lack of pigmentation, the film cannot be produced reliably (cannot be wound), and its capability for further processing is limited.

EP-A 0 035 835 describes a coextruded sealable polyester film where, to improve the winding and processing characteristics, the sealing layer contains particles whose average particle size exceeds the thickness of the sealing layer. The particulate additives create surface protrusions preventing the undesirable blocking and sticking of the film to rolls or guides. No further information is provided on the incorporation of antiblocking agents with regard to the other, nonsealable layer of the film. It remains moot whether this layer contains antiblocking agents. Choosing particles having a larger diameter than the sealing layer and the concentrations reported in the examples has an adverse effect on the sealing characteristics of the film. The reference provides no information on the sealing temperature range of the film. The seal seam strength is measured at 140° C. and found to be in the range from 63 to 120 N/m (which corresponds to 0.97 to 1.8 N/15 mm of film width).

EP-A 0 432 886 describes a coextruded, multilayer polyester film which has a first surface on which has been arranged a sealable layer, and has a second surface on which has been arranged an acrylate layer. The sealable outer layer here may also be composed of isophthalic-acid-containing and terephthalic-acid-containing copolyesters. The coating on the reverse side gives the film improved processing performance. The patent gives no indication of the sealing range of the film. The seal seam strength is measured at 140° C. For a sealable layer thickness of 11 µm the seal seam strength given is 761.5 N/m (11.4 N/15 mm). A disadvantage of the reverse-side acrylate coating is that this side is now not sealable with respect to the sealable outer layer, and the film therefore has only very restricted use.

EP-A 0 515 096 describes a coextruded, multilayer, sealable polyester film which comprises a further additive on the sealable layer. The additive may comprise inorganic particles, for example, and is preferably applied in an aqueous layer to the film during its production. Using this method, the film is claimed to retain its good sealing properties and to be easy to process. The reverse side comprises only very few particles, most of which pass into this layer via the recycled material. This patent again gives no indication of the sealing temperature range of the film. The seal seam strength is measured at 140° C. and is above 200 N/m (3 N/15 mm). For a sealable layer of 3 µm thickness the seal seam strength given is 275 N/m (4.125 N/15 mm).

WO 98/06575 describes a coextruded, multilayer polyester film which comprises a sealable outer layer and a nonsealable base layer. The base layer here may have been built up from one or more layers, and one of these layers is in contact with the sealable layer. The other (outward-facing) layer then forms the second nonsealable outer layer. Here, too, the sealable outer layer may be composed of isophthalic-acid-containing and terephthalic-acid-containing copolyesters, but these comprise no antiblocking particles. The film also comprises at least one UV absorber, which is added to the base layer in a weight ratio of from 0.1 to 10%. The base layer of this film has conventional antiblocking agents. The film has good sealability, but does not have the desired processing performance and has shortcomings in optical properties (gloss and haze).

It was therefore an object of the present invention to provide a sealable, biaxially oriented polyester film which does not have the disadvantages of the prior art films mentioned and which in particular has improved sealability and improved processability, while otherwise its optical properties remain the same or even improve. It was a particular object of the present invention to extend the sealing range of the film toward low temperatures, and to improve the seal seam strength of the film. In addition, the film was also to be processable on high-speed processing machinery. It should also be ensured that any cut material arising during film production can be reintroduced as recycled material to the production process in amounts of up to 60% by weight, based on the total weight of the film, without adversely affecting the physical or optical properties of the film.

SUMMARY OF THE INVENTION

According to the invention, the object is achieved by providing a coextruded, biaxially oriented, sealable polyester film with at least a base layer (B), with a sealable outer layer (A) and with another outer layer (C), where the sealable outer layer A has a minimum sealing temperature of not more than 110° C. and a seal seam strength of at least 1.3 N/15 mm of film width, and the topograhies of the two outer layers (A) and (C) have the following features:

Sealable outer layer (A):

$R_a \leq 40$ nm

Value measured for gas flow within the range from 300 to 4000 s.

Nonsealable outer layer (C):

$COF \leq 0.5$ $40$ nm $\leq R_a \leq 150$ nm

Value measured for gas flow $\leq 140$ s.

Number of elevations $N_c$ per mm² of film surface correlated with their respective heights h via the following equations:

$$A_{C1} - B_{C1} \cdot \log h/\mu m < \log N_C/mm^2 < A_{C2} - B_{C2} \cdot \log h/\mu m$$

$$0.01\ \mu m \leq h \leq 10\ \mu m$$

$A_{C1} = 0.29\ B_{C1} = 3.30$ $A_{C2} = 1.84\ B_{C2} = 2.70$.

The subclaims give preferred embodiments of the invention, and these are described in more detail below.

DETAILED DESCRIPTION OF THE INVENTION

According to the invention, the film has at least three layers and then embraces the base layer (B), the sealable outer layer (A) and the nonsealable outer layer (C).

Polymers Used for the Base and for the Outer Layer
Base Material

At least 90% by weight of the base layer (B) is preferably composed of a thermoplastic polyester. Polyesters suitable for this purpose are those made from ethylene glycol and terephthalic acid (polyethylene terephthalate, PET), from ethylene glycol and naphthalene-2,6-dicarboxylic acid (polyethylene 2,6-naphthalate, PEN), from 1,4-bishydroxymethylcyclohexane and terephthalic acid (poly-1,4-cyclohexanedimethylene terephthalate, PCDT), or else made from ethylene glycol, naphthalene-2,6-dicarboxylic acid and biphenyl-4,4'-dicarboxylic acid (polyethylene 2,6-naphthalate dibenzoate, PENBB). Particular preference is given to polyesters at least 90 mol %, preferably at least 95 mol %, of which is composed of ethylene glycol units and terephthalic acid units, or of ethylene glycol units and naphthalene-2,6-dicarboxylic acid units. The remaining monomer units derive from other aliphatic, cycloaliphatic or aromatic diols and, respectively, dicarboxylic acids, as may also occur in the layer (A) or in the layer (C).

Other examples of suitable aliphatic diols are diethylene glycol, triethylene glycol, aliphatic glycols of the formula $HO—(CH_2)_n—OH$, where n is an integer from 3 to 6 (in particular 1,3-propanediol, 1,4-butanediol, 1,5 pentanediol and 1,6-hexanediol) and branched aliphatic glycols having up to 6 carbon atoms. Among the cycloaliphatic diols, mention should be made of cyclohexanediols (in particular 1,4-cyclohexanediol). Examples of other suitable aromatic diols have the formula $HO—C_6H_4—X—C_6H_4—OH$, where X is $—CH_2—$, $—C(CH_3)_2—$, $—C(CF_3)_2—$, $—O—$, $—S—$ or $—SO_2—$. Bisphenols of the formula $HO—C_6H_4—C_6H_4—OH$ are also very suitable.

Other aromatic dicarboxylic acids are preferably benzenedicarboxylic acids, naphthalene dicarboxylic acids (such as naphthalene-1,4- or -1,6-dicarboxylic acid), biphenyl-x,x'-dicarboxylic acids (in particular biphenyl-4,4'-dicarboxylic acid), diphenylacetylene-x,x'-dicarboxylic acids (in particular diphenylacetylene-4,4'-dicarboxylic acid) or stilbene-x,x'-dicarboxylic acids. Among the cycloaliphatic dicarboxylic acids mention should be made of cyclohexanedicarboxylic acids (in particular cyclohexane-1,4-dicarboxylic acid). Among the aliphatic dicarboxylic acids, the $C_3$–$C_{19}$ alkanediacids are particularly suitable, and the alkane moiety here may be straight-chain or branched.

One way of preparing the polyesters is the transesterification process. Here, the starting materials are dicarboxylic esters and diols, which are reacted using the customary transesterification catalysts, such as the salts of zinc, of calcium, of lithium, of magnesium or of manganese. The intermediates are then polycondensed in the presence of well-known polycondensation catalysts, such as antimony trioxide or titanium salts. Another equally good preparation method is the direct esterification process in the presence of polycondensation catalysts. This starts directly from the dicarboxylic acids and the diols.

Sealable Outer Layer (A)

The sealable outer layer (A) applied by coextrusion to the base layer (B) is based on polyester copolymers and essentially consists of copolyesters composed predominantly of isophthalic acid units and of terephthalic acid units and of ethylene glycol units. The remaining monomer units are derived from other aliphatic, cycloaliphatic or aromatic diols and, respectively, dicarboxylic acids, as may also be present in the base layer. The preferred copolyesters which provide the desired sealing properties are those composed of ethylene terephthalate units and ethylene isophthalate units, and of ethylene glycol units. The proportion of ethylene terephthalate is from 40 to 95 mol % and the corresponding proportion of ethylene isophthalate is from 60 to 5 mol %. Preference is given to copolyesters in which the proportion of ethylene terephthalate is from 50 to 90 mol % and the corresponding proportion of ethylene isophthalate is from 50 to 10 mol %, and very particular preference is given to copolyesters in which the proportion of ethylene terephthalate is from 60 to 85 mol % and the corresponding proportion of ethylene isophthalate is from 40 to 15 mol %.

Nonsealable Outer Layer (C)

For the other, nonsealable outer layer (C), or for any other intermediate layers present, use in principle may be made of the same polymers as described above for the base layer (B).

Sealing and Processing Properties

The desired sealing and processing properties of the film of the invention are obtained from the properties of the copolyester used for the sealable outer layer combined with the topographies of the sealable outer layer (A) and the nonsealable outer layer (C).

The minimum sealing temperature of not more than 110° C. and the seal seam strength of at least 1.3 N/15 mm of film width are achieved when the copolymers more particularly described above are used for the sealable outer layer (A). The best sealing properties for the film are achieved when no other additives, in particular no inorganic or organic fillers, are added to the copolymer. For a given copolyester, this gives the lowest minimum sealing temperature and the highest seal seam strengths. However, in this case the handling of the film is poor, since the surface of the sealable outer layer (A) has a marked tendency to block. The film is difficult to wind and is not at all suitable for further processing on high-speed packaging machinery. To improve the handling of the film and its processability it is necessary to modify the sealable outer layer (A). This is best done with the aid of suitable antiblocking agents of selected size, a certain amount of which is added to the sealable layer, and specifically in such a way as firstly to minimize blocking of the film and secondly to bring about only insignificant impairment of the sealing properties. Surprisingly, this desired combination of properties can be achieved when the topography of the sealable outer layer (A) is characterized by the following set of parameters:

According to the invention, the roughness of the sealable outer layer, expressed by the $R_a$, should be less than or equal to 40 nm. Otherwise the sealing properties for the purposes of the present invention are adversely affected.

According to the invention, the value measured for gas flow should be within the range from 300 to 4000 s. At values below 300 s, the sealing properties for the purposes of the present invention are adversely affected, while at values above 4000 s the handling of the film is impaired.

For further improvement in the processing properties of the sealable film, the topography of the nonsealable outer layer (C) should be characterized by the following set of parameters:

According to the invention, the coefficient of friction (COF) of this side with respect to itself should be less than or equal to 0.5. Otherwise the winding performance and further processing of the film are unsatisfactory.

The roughness of the nonsealable outer layer (C), expressed as its $R_a$, should be greater than or equal to 40 nm and less than or equal to 150 nm. $R_a$ values below 40 nm have adverse effects on the winding and processing performance of the film, while $R_a$ values above 150 nm 20 impair the optical properties (gloss, haze) of the film.

According to the invention, the value measured for gas flow for the outer layer (C) should be within the range below 140 s. At values above 140 s, the winding and processing performance of the film is adversely affected.

The number of elevations N per mm² of film surface is correlated with their respective heights h via the following equation:

$$0.29 - 3.30 \cdot \log h/\mu m < \log N/mm^2 < 1.84 - 2.70 \cdot \log h/\mu m$$

where $$0.01\ \mu m \leq h \leq 10\ \mu m$$

If the values for N are smaller than given by the left-hand side of the inequality, the winding and processing performance of the film is adversely affected, and if the values for N are greater than given by the right-hand side of the inequality, the gloss and the haze of the film are adversely affected.

Antiblocking Agents

The base layer (B) may also comprise conventional additives, such as stabilizers and/or antiblocking agents. The two other layers (A) and (C) may also comprise conventional additives, such as stabilizers and/or antiblocking agents. It is expedient to add the agents to the polymer or to the polymer mixture prior to melting. The stabilizers used advantageously comprise phosphorus compounds, for example, such as phosphoric acid or phosphoric esters.

Typical antiblocking agents (in this context also termed "pigments") are inorganic or organic particles, such as calcium carbonate, amorphous silica, talc, magnesium carbonate, barium carbonate, calcium sulfate, barium sulfate, lithium phosphate, calcium phosphate, magnesium phosphate, aluminum oxide, LiF, the calcium, barium, zinc or manganese salts of the dicarboxylic acids used, carbon black, titanium dioxide, kaolin, or crosslinked polystyrene particles or crosslinked acrylate particles.

The antiblocking agents selected may also be mixtures of two or more different antiblocking agents or mixtures of antiblocking agents of the same composition but of different particle size. The particles may be added to each layer in respective advantageous concentrations, e.g. as a glycolic dispersion during the poly-condensation, or by way of masterbatches during extrusion.

Preferred particles are $SiO_2$ in colloidal or in chain. form. These particles become very well bound into the polymer matrix and create only very few vacuoles.

Vacuoles generally cause haze and it is therefore appropriate to avoid these. There is no restriction in principle on the diameters of the particles used. However, it has proven appropriate for achieving the object to use particles with an average primary particle diameter below 100 nm, preferably below 60 nm and particularly preferably below 50 nm, measured by the sedigraph method, and/or particles with an average primary particle diameter not less than 1 $\mu$m, preferably not less than 1.5 $\mu$m and particularly preferably not less than 2 $\mu$m. However, the average particle diameter of these particles described last should not be above 5 $\mu$m.

To achieve the abovementioned properties of the sealable film, it has also proven to be appropriate to select a particle concentration in the base layer B which is lower than in the two outer layers (A) and (C). In a three-layer film of the type mentioned the particle concentration in the base layer (B) will be from 0 to 0.15% by weight, preferably from 0 to 0.12% by weight and in particular from 0 to 0.10% by weight. There is no restriction in principle on the diameter of the particles used, but particular preference is given to particles with an average diameter not less than 1 $\mu$m.

In its advantageous usage form, the film is composed of three layers: the base layer (B) and, applied on both sides of this base layer, outer layers (A) and (C), and outer layer (A) is sealable with respect to itself and with respect to outer layer (C).

To achieve the property profile mentioned for the film, the outer layer (C) has more pigments (i.e. a higher pigment concentration) than the outer layer (A). According to the invention, the pigment concentration in this second outer layer (C) is from 0.1 to 1.0% by weight, advantageously from 0.12 to 0.8% by weight and in particular from 0.15 to 0.6% by weight. In contrast, the other outer layer (A), which is sealable and positioned opposite to the outer layer (C), has a lower degree of filling with inert pigments. The concentration of the inert particles in layer (A) is from 0.01 to 0.2% by weight, preferably from 0.015 to 0.15% by weight and in particular from 0.02 to 0.1% by weight, all weight % ages being based on the total weight of the respective layer.

Between the base layer and the outer layers there may, if desired, also be an intermediate layer. This may again be composed of the polymers described for the base layers. In one particularly preferred embodiment, the intermediate layer is composed of the polyester used for the base layer. The intermediate layer may also comprise the customary additives described. The thickness of the intermediate layer is generally above 0.3 $\mu$m, preferably in the range from 0.5 to 15 $\mu$m, in particular in the range from 1.0 to 10 $\mu$m and particularly preferably in the range from 1.0 to 5 $\mu$m.

In the particularly advantageous three-layer embodiment of the novel film, the thickness of the outer layers (A) and (C) is generally above 0.1 $\mu$m, and is generally in the range from 0.2 to 4.0 $\mu$m, particularly preferably in the range from 0.2 to 3.5 $\mu$m, in particular in the range from 0.3 to 3 $\mu$m and very particularly preferably in the range from 0.3 to 2.5 $\mu$m, and the thicknesses of the outer layers (A) and (C) may be identical or different.

The total thickness of the novel polyester film may vary within wide limits. It is from 3 to 80 $\mu$m, in particular from 4 to 50 $\mu$m, preferably from 5 to 30 $\mu$m, the layer (B) preferably making up from 5 to 90% of the total thickness.

In producing the film, the polymers for the base layer B and the two outer layers (A) and (C) are introduced to three extruders. Any foreign bodies or contamination present may be removed from the polymer melt by means of suitable filters prior to extrusion. The melts are then extruded in a coextrusion die to give flat melt films, and layered one upon the other. The multilayer film is then drawn off and solidified with the aid of a chill roll and, if desired, other rolls.

Production Process

The invention also provides a process for producing the polyester film of the invention by the coextrusion process known from the literature.

The procedure for this process is that the melts corresponding to the individual layers (A), (B) and (C) of the film are coextruded through a flat-film die, the resultant film is drawn off for solidification on one or more rolls, the film is then biaxially stretched (oriented), and the biaxially stretched film is heat-set and, if desired, corona- or flame-treated on the surface layer intended for treatment.

The biaxial stretching (orientation) is generally carried out sequentially, and preference is given to sequential biaxial stretching in which stretching is first longitudinal (in the machine direction) and then transverse (perpendicular to the machine direction).

As is usual in coextrusion, the polymer or the polymer mixture for the individual layers is first compressed and plasticized in an extruder, and any additives used may already be present in the polymer or the polymer mixture.

The melts are then simultaneously extruded through a flat-film die (slot die), and the extruded multilayer film is drawn off on one or more take-off rolls, whereupon it cools and solidifies.

The biaxial orientation is generally carried out equentially, preferably orienting first longitudinally (i.e. in the machine direction=MD) and then transversely (i.e. perpendicularly to the machine direction=TD). This gives orientation of the molecular chains. The longitudinal orientation can be carried out with the aid of two rolls running at different speeds corresponding to the desired stretching ratio. For the transverse orientation use is generally made of an appropriate tenter frame, clamping both edges of the film and then drawing toward the two sides at an elevated temperature.

The temperature at which the orientation is carried out may vary over a relatively wide range and depends on the film properties desired. The longitudinal stretching is generally carried out at from about 80 to 130° C., and the transverse stretching at from about 80 to 150° C. The longitudinal stretching ratio is generally in the range from 2.5:1 to 6:1, preferably from 3:1 to 5:1. The transverse stretching ratio is generally in the range from 3.0:1 to 5.0:1, preferably from 3.5:1 to 4.5:1. Prior to the transverse stretching, one or both surfaces of the film may be in-line coated by known processes. The in-line coating may serve, for example, to give improved adhesion of a metal layer or of any printing ink applied, or else to improve antistatic performance or processing performance.

For producing a film with very good sealing properties it has proven advantageous for the planar orientation $\Delta p$ of the film to be less than 0.168, but particularly less than 0.165. In this case the strength of the film in the direction of its thickness is so great that when the seal seam strength is measured it is specifically the seal seam which separates, and the tear does not enter the film or propagate therein.

The significant variables affecting the planar orientation $\Delta p$ have been found to be the longitudinal and transverse stretching parameters, and also the SV (standard viscosity) of the raw material used. The processing parameters include in particular the longitudinal and transverse stretching ratios ($\lambda_{MD}$ and $\lambda_{TD}$), the longitudinal and transverse stretching temperatures ($T_{MD}$ and $T_{TD}$), the film web speed and the nature of the stretching, in particular that in the longitudinal direction of the machine. For example, if the planar orientation $\Delta p$ obtained with a machine is 0.169 with the following set of parameters: $\lambda_{MD}$=4.8 and $\lambda_{TD}$=4.0, a longitudinal stretching temperature $T_{MD}$ of from 80–118° C. and a transverse stretching temperature $T_{TD}$ of from 80–125° C., then increasing the longitudinal stretching temperature $T_{MD}$ to 80–125° C. or increasing the transverse stretching temperature $T_{TD}$ to 80–135° C., or lowering the longitudinal stretching ratio $\lambda_{MD}$ to 4.3 or lowering the transverse stretching ratio $\lambda_{TD}$ to 3.7 gives a planar orientation $\Delta p$ within the desired range. The film web speed here was 340 m/min and the SV (standard viscosity) of the material was about 730. For the longitudinal stretching, the data mentioned are based on what is known as N-TEP stretching, composed of a low-orientation stretching step (LOE, Low Orientation Elongation) and a high-orientation stretching step (REP, Rapid Elongation Process). Other stretching systems in principle give the same ratios, but the numeric values for each process parameter may be slightly different. The temperatures given are based on the respective roll temperatures in the case of the longitudinal stretching and on infrared-measured film temperatures in the case of the transverse stretching.

In the heat-setting which follows, the film is held for from 0.1 to 10 s at a temperature of from 150 to 250° C. The film is then wound up in a usual manner.

After the biaxial stretching it is preferable for one or both surfaces of the film to be corona- or flame-treated by one of the known methods. The intensity of the treatment is generally in the range above 45 mN/m.

The film may also be coated in order to achieve other desired properties. Typical coatings are layers with adhesion-promoting, antistatic, slip-improving or release action. These additional layers may, it will be appreciated, be applied to the film by way of in-line coating, using aqueous dispersions, prior to the transverse stretching step.

Advantages of the Invention

The novel film has excellent sealability, very good handling properties and very good processing performance. The sealable outer layer (A) of the film seals not only with respect to itself (fin sealing) but also with respect to the nonsealable outer layer (C) (lap sealing). The minimum sealing temperature for the lap sealing here is only about 10 K higher, and the reduction in the seal seam strength is not more than 0.3 N/15 mm.

The gloss and haze of the film are also improved considerably. In producing the novel film it is certain that material for recycling can be refed to the extrusion process at a concentration of from 20 to 60% by weight, based on the total weight of the film, without any significant adverse effect on the physical properties of the film, in particular on its appearance.

The film is accordingly very useful in flexible packaging, especially where its excellent sealing properties and its good processability come in useful. This is in particular its use on high-speed packaging machines.

The most important film properties according to the invention can be seen again at a glance in the table below (Table 1).

TABLE 1

| | Range according to the invention | Preferred | Particularly preferred | Unit | Test method |
|---|---|---|---|---|---|
| OUTER LAYER A | | | | | |
| Minimum sealing temperature | <110 | <105 | <100 | ° C. | internal |
| Seal seam strength | >1.3 | >1.5 | >1.8 | N/15 mm | internal |
| Average roughness $R_a$ | ≦40 | ≦30 | ≦20 | nm | DIN 4768, cut-off of 0.25 mm |
| Range of values measured for gas flow | 300–4000 | 500–3500 | 1000–3000 | sec | internal |
| Gloss, 20° | >120 | >130 | >140 | | DIN 67530 |
| OUTER LAYER C | | | | | |
| COF | <0.5 | <0.45 | <0.40 | | DIN 53375 |
| Average roughness $R_a$ | 40 to 150 | 45 to 120 | 50 to 90 | nm | DIN 4768, cut-off of 0.25 mm |
| Range of values measured for gas flow | ≦140 | ≦120 | ≦100 | sec | internal |
| Constants $A_1/A_2$ and $B_1/B_2$ | 0.29/3.00 and 1.84/2.7 | | | | |
| Gloss, 20° | >140 | >150 | >160 | | DIN 67530 |

TABLE 1-continued

| | Range according to the invention | Preferred | Particularly preferred | Unit | Test method |
|---|---|---|---|---|---|
| Other film properties | | | | | |
| Haze | <4 | <3 | <2.5 | % | ASTM-D 1003-52 |
| Planar orientation | <0.168 | <0.165 | <0.163 | | internal |

The following test methods were utilized for the purposes of the present invention to characterize the raw materials and the films:

SV (Standard Viscosity)

The standard viscosity SV (DCA) is measured in dichloroacetic acid by a method based on DIN 53726.

The intrinsic viscosity (IV) is calculated as follows from the standard viscosity $$IV(DCA) = 6.907 \cdot 10^{-4} SV(DCA) + 0.063096$$

Determination of Minimum Sealing Temperature

Hot-sealed specimens (seal seam 20 mm×100 mm) are produced with a Brugger HSG/ET sealing apparatus, by sealing the film at different temperatures with the aid of two heated sealing jaws at a sealing pressure of 2 bar and with a sealing time of 0.5 s. From the sealed specimens test strips of 15 mm width were cut. The T-seal seam strength was measured as in the determination of seal seam strength. The minimum sealing temperature is the temperature at which a seal seam strength of at least 0.5 N/15 mm is achieved.

Seal Seam Strength

To determine the seal seam strength, two film strips of width 15 mm were placed one on top of the other and sealed at 130° C. with a sealing time of 0.5 s and a sealing pressure of 2 bar (apparatus: Brugger model NDS, single-side-heated sealing jaw). The seal seam strength was determined by the T-peel method.

Coefficient of Friction

The coefficient of friction was determined to DIN 53 375. The coefficient of sliding friction was measured 14 days after production.

Surface Tension

Surface tension was determined by what is known as the ink method (DIN 53 364).

Haze

The Hölz haze was measured by a method based on ASTM-D 1003-52 but, in order to utilize the most effective measurement range, measurements were made on four pieces of film laid one on top of the other, and a 1° slit diaphragm was used instead of a 4° pinhole.

Gloss

Gloss was determined to DIN 67 530. The reflectance was measured as an optical value characteristic of a film surface. Based on the standards ASTM-D 523-78 and ISO 2813, the angle of incidence was set at 20° or 60°. A beam of light hits the flat test surface at the set angle of incidence and is reflected and/or scattered thereby. A proportional electrical variable is displayed representing light rays hitting the photoelectronic detector. The value measured is dimensionless and must be stated together with the angle of incidence.

Determination of Particle Sizes on Film Surfaces

A scanning electron microscope and an image analysis system are used to determine the size distribution of elevations on film surfaces. Use is made of the XL30 CP scanning electron microscope from Philips with an integrated image analysis program: AnalySIS from Soft-Imaging System.

For these measurements, specimens of film are placed flat on a specimen holder. These are then metalized obliquely at an angle a with a thin metallic layer (e.g. of silver). The symbol a here is the angle between the surface of the specimen and the direction of diffusion of the metal vapor. This oblique metalization throws a shadow behind the elevation. Since the shadows are not at this stage electrically conductive, the specimen is then further sputtered or metalized with a second metal (e.g. gold), the second coating here impacting vertically onto the surface of the specimen in such a way as not to produce any shadows in the second coating.

Scanning electron microscope (SEM) images are taken of the specimen surfaces prepared in this way. The shadows of the elevations are visible because of the contrast of the metallic materials. The specimen is oriented in the SEM in such as way that the shadows run parallel to one edge of the image. The following conditions are set in the SEM for recording the image: secondary electron detector, operating distance 10 mm, acceleration voltage 10 kV and spot 4.5. The brightness and contrast are set in such a way that all of the information in the image is represented as gray values and the intensity of the background noise is sufficiently small for it not to be detected as a shadow. The length of the shadows is measured by image analysis. The threshold value for shadow identification is set at the point where the second derivative of the gray value distribution of the image passes through the zero point. Before shadow identification, the image is smoothed with an N×N filter (size 3, 1 iteration). A frame is set so as to ensure that elevations which are not reproduced in their entirety in the image are not included in the measurements. The magnification, the size of the frame and the number of images evaluated are selected in such a way that a total film surface of 0.36 mm² is evaluated.

The height of the individual elevations is computed from the individual shadow lengths using the following relationship:

$$h = (\tan \alpha) * L$$

where h is the height of the elevation, α is the metalization angle and L is the shadow length. The elevations recorded in this way are classified so as to arrive at a frequency distribution. The classification is into classes of 0.05 mm width between 0 and 1 mm, the smallest class (from 0 to 0.05 mm) not being used for further evaluation calculations. The diameters (dimension perpendicular to the direction of shadow throw) of the elevations are classified in a similar way in classes of 0.2 mm width from 0 to 10 mm, and here again the smallest class is again used for further evaluation.

Surface Gas Flow Time

The principle of the test method is based on the air flow between one side of the film and a smooth silicon wafer sheet. The air flows from the surroundings into an evacuated space, and the interface between film and silicon wafer sheet acts as a flow resistance.

A round specimen of film is placed on a silicon wafer sheet in the middle of which there is a hole providing the connection to the receiver. The receiver is evacuated to a pressure below 0.1 mbar. The time in seconds taken by the air to establish a pressure rise of 56 mbar in the receiver is determined.

Test Conditions

| Test area | 45.1 cm² |
| --- | --- |
| Weight applied | 1276 g |
| Air temperature | 23° C. |
| Humidity | 50% relative humidity |
| Aggregated gas volume | 1.2 cm³ |
| Pressure difference | 56 mbar |

Determination of Planar Orientation Δp

Planar orientation is determined by measuring the refractive index with an Abbe refractometer according to internal operating prescription 24.

Preparation of Specimens

Specimen size and length: from 60 to 100 mm

Specimen width: corresponds to prism width of 10 mm

To determine $n_{MD}$ and $n_\alpha$ (=$n_z$), the specimen to be tested has to be cut out from the film with the running edge of the specimen running precisely in the direction TD. To determine $n_{TD}$ and $n_\alpha$ (=$n_z$), the specimen to be tested has to be cut out from the film with the running edge of the specimen running precisely in the direction MD. The specimens are to be taken from the middle of the film web. Care must be taken that the temperature of the Abbe refractometer is 23° C. Using a glass rod, a little diiodomethane (N =1.745) or diiodomethane-bromo-naphthalene mixture is applied to the lower prism, which has been cleaned thoroughly before the test. The refractive index of the mixture must be greater than 1.685. The specimen cut out in the direction TD is firstly laid on top of this, in such a way that the entire surface of the prism is covered. Using a paper wipe the film is now firmly pressed flat onto the prism, so that it is firmly and smoothly positioned thereon. The excess liquid must be sucked away. A little of the test liquid is then dropped onto the film. The second prism is swung down and into place and pressed firmly into contact. The right-hand knurled screw is then used to turn the indicator scale until a transition from light to dark can be seen in the field of view in the range from 1.62 to 1.68. If the transition from light to dark is not sharp, the colors are brought together using the upper knurled screw in such a way that only one light and one dark zone are visible. The sharp transition line is brought to the crossing point of the two diagonal lines (in the eyepiece) using the lower knurled screw. The value now indicated on the measurement scale is read off and entered into the test record. This is the refractive index $n_{mD}$ in the machine direction. The scale is now turned using the lower knurled screw until the range visible in the eyepiece is from 1.49 to 1.50.

The refractive index na or $n_\alpha$ $n_z$ the direction of the thickness of the film) is then determined. To improve the visibility of the transition, which is only weakly visible, a polarization film is placed over the eyepiece. This is turned until the transition is clearly visible. The same considerations apply as in the determination of $n_{MD}$. If the transition from light to dark is not sharp (colored), the colors are brought together using the upper knurled screw in such a way that a sharp transition an be seen. This sharp transition line is brought into the crossing point of the two diagonal lines using the lower knurled screw, and the value indicated on the scale is read off and entered into the table.

The specimen is then turned, and the corresponding refractive indices $n_{MD}$ and $n_\alpha$ (=$n_z$) of the other side are measured and entered into an appropriate table.

After determining the refractive indices in, respectively, the direction MD and the direction of the thickness of the film, the specimen strip cut out in the direction MD is placed in position and the refractive indices $n_{TD}$ and $n_\alpha$ (=$n_z$) are determined accordingly. The strip is turned over, and the values for the B side are measured. The values for the A side and the B side are combined to give average refractive indices. The orientation values are then calculated from the refractive indices using the following formulae:

$$\Delta n = n_{MD} - n_{TD}$$

$$\Delta p = (n_{MD} + n_{TD})/2 - n_z$$

$$n_{av} = (n_{MD} + n_{TD} + n_z)/3$$

EXAMPLE 1

Chips made from polyethylene terephthalate (prepared by the transesterification process with Mn as transesterification catalyst, Mn concentration: 100 ppm) were dried at 150° C. to residual moisture below 100 ppm and fed to the extruder for the base layer (B). Chips made from polyethylene terephthalate and a filler were likewise fed to the extruder for the nonseaslable outer layer (C).

Alongside this, chips were prepared made from a linear polyester which is composed of an amorphous copolyester with 78 mol % of ethylene terephthalate and 22 mol % of ethylene isophthalate (prepared via the trans-esterification process with Mn as transesterification catalyst, Mn concentration: 100 ppm) .The copolyester was dried at a temperature of 100° C. to a residual moisture below 200 ppm and fed to the extruder for the sealable outer layer (A).

Coextrusion followed by stepwise longitudinal and transverse orientation was then used to produce a transparent, three-layer film with ABC structure and with a total thickness of 12 μm. The thickness of each outer layer can be seen in Table 2.

Outer layer (A), a mixture made from:

97.0% by weight of copolyester with an SV of 800

3.0% by weight of masterbatch made from 97.75% by weight of copolyester (SV of 800) and 1.0% by weight of ®Sylobloc 44 H (synthetic SiO₂ from Grace) and 1.25% by weight of ®Aerosil TT 600 (pyrogenic SiO₂ from Degussa)

Base layer (B):

100.0% by weight of polyethylene terephthalate with an SV of 800

Outer layer (C), a mixture made from:

88% by weight of polyethylene terephthalate with an SV of 800

12% by weight of masterbatch made from 97.75% by weight of copolyester (SV of 800) and 1.0% by weight of Sylobloc 44 H (synthetic SiO₂ from Grace) and 1.25% by weight of Aerosil TT 600 (chain-type SiO₂ from Degussa)

The production conditions in each process step were:

| Extrusion: | Temperatures | Layer A: | 3e + 08 | ° C. |
| --- | --- | --- | --- | --- |
| | | Layer B: | | ° C. |
| | | Layer C: | | ° C. |
| | Die width: | | 2.5 | mm |
| | Take-off roll temperature | | 30 | ° C. |
| Longitudinal stretching: | Temperature: | | 80–125 | ° C. |
| | Longitudinal stretching ratio: | | 4.2 | |

-continued

| | | | |
|---|---|---|---|
| Transverse stretching: | Temperature: | 80–135 | °C. |
| | Transverse stretching ratio | 4 | |
| Heat-setting: | Temperature: | 230 | °C. |
| | Duration: | 3 | s |

The film had the required good sealing properties and the required handling, and the required processing performance. Tables 2 and 3 show the structure of the films and the properties achieved in films produced in this way.

EXAMPLE 2

As Example 1, except that the outer layer thickness for the sealable layer (A) was raised from 1.5 to 2.0 μm, with otherwise identical film structure and an identical method of production. This gives an improvement in the sealing properties, and in particular the seal seam strength improves markedly.

EXAMPLE 3

As Example 1, except that a film of 20 μm thickness was produced. The outer layer thickness for the sealable layer (A) was 2.5 μm and the thickness for the nonsealable layer (C) was 2.0 μm. This again improves the sealing properties, and in particular the seal seam strength improves markedly. Again, there has been a slight improvement in the handling of the film.

EXAMPLE 4

As Example 3, except that the copolymer for the sealable outer layer (A) was changed. Instead of the amorphous copolyester having 78 mol % of polyethylene terephthalate and 22 mol % of ethylene isophthalate, use was made of an amorphous copolyester having 70 mol % of polyethylene terephthalate and 30 mol % of ethylene isophthalate. The polymer was processed on a vented twin-screw extruder but did not have to be predried. The outer layer thickness for the sealable layer (A) was again 2.5 μm, and the thickness of the nonsealable layer (C) was 2.0 μm. This improved the sealing properties, and in particular there was a marked improvement in the seal seam strength. To achieve good handling and good processing performance from the film, the pigment concentration in the two outer layers was slightly raised.

Comparative Example 1

As Example 1, except that the sealable outer layer (A) was unpigmented. Although this has improved the sealing properties somewhat, the handling of the film and its processing performance have deteriorated unacceptably.

Comparative Example 2

As Example 1, except that the sealable outer layer (A) had the same pigmentation level as the nonsealable outer layer (C). This measure has improved the handling and the processing properties of the film, however the sealing properties have become markedly poorer.

Comparative Example 3

As Example 1, except that the nonsealable outer layer (A) was given markedly less pigmentation. The handling and processing performance of the film has become markedly poorer.

Comparative Example 4

Example 1 from EP-A-0 035 835 was repeated. The sealing performance of the film, its handling properties and its processing performance are poorer than in the examples according to the invention.

TABLE 2

| Example | Film thickness μm | Film structure | Layer thicknesses μm | | | Pigments in layers | | | Average pigment diameter in layers μm | | | Pigment concentrations ppm | | |
|---|---|---|---|---|---|---|---|---|---|---|---|---|---|---|
| | | | A | B | C | A | B | C | A | B | C | A | B | C |
| E 1 | 12 | ABC | 1.5 | 9 | 1.5 | Sylobloc 44 H Aerosil TT 600 | none | Sylobloc 44 H Aerosil TT 600 | 2.5 0.04 | | 2.5 0.04 | 300 375 | 0 | 1200 1500 |
| E 2 | 12 | ABC | 2 | 8.5 | 1.5 | Sylobloc 44 H Aerosil TT 600 | none | Sylobloc 44 H Aerosil TT 600 | 2.5 0.04 | | 2.5 0.04 | 300 375 | 0 | 1200 1500 |
| E 3 | 20 | ABC | 2.5 | 15.5 | 2 | Sylobloc 44 H Aerosil TT 600 | none | Sylobloc 44 H Aerosil TT 600 | 2.5 0.04 | | 2.5 0.04 | 300 375 | 0 | 1200 1500 |
| E 4 | 20 | ABC | 2.5 | 15.5 | 2 | Sylobloc 44 H Aerosil TT 600 | none | Sylobloc 44 H Aerosil TT 600 | 2.5 0.04 | | 2.5 0.04 | 400 500 | 0 | 1500 1875 |
| CE 1 | 12 | ABC | 1.5 | 9 | 1.5 | none | none | Sylobloc 44 H Aerosil TT 600 | | | 2.5 0.04 | | 0 | 1200 1500 |
| CE 2 | 12 | ABC | 1.5 | 9 | 1.5 | Sylobloc 44 H Aerosil TT 600 | none | Sylobloc 44 H Aerosil TT 600 | 2.5 0.04 | | 2.5 0.04 | 300 375 | 0 | 1200 1500 |
| CE 3 | 12 | ABC | 1.5 | 9 | 1.5 | Sylobloc 44 H Aerosil TT 600 | none | Sylobloc 44 H Aerosil TT 600 | 2.5 0.04 | | 2.5 0.04 | 300 375 | 0 | 600 750 |
| CE 4 | 15 | AB | 2.25 | 12.8 | | Gasil 35 | none | | 3 | | | 2500 | 0 | |

TABLE 3

| Example | Minimum sealing temperature °C. A side with respect to A side | Seal seam strength A side with respect to A side | Coefficient of friction COF C side with respect to C side | Average roughness $R_a$, nm | | Values measured for gas flow | | Constants | | | Gloss | | Haze | Winding performance and handling properties | Processing performance |
|---|---|---|---|---|---|---|---|---|---|---|---|---|---|---|---|
| | | | | A side | C side | A side | C side | A | C | A/B Δp | A side | C side | | | |
| E 1 | 100 | 2.0 | 0.45 | 25 | 65 | 1200 | 120 | 0.5 | 3.1 | 0.17 | 140 | 170 | 2.5 | ++ | ++ |
| E 2 | 98 | 2.7 | 0.45 | 26 | 65 | 1280 | 120 | 0.5 | 3.1 | 0.17 | 140 | 170 | 2.5 | ++ | ++ |
| E 3 | 95 | 3 | 0.41 | 23 | 61 | 1110 | 120 | 0.5 | 3.1 | 0.17 | 130 | 170 | 3 | ++ | ++ |
| E 4 | 85 | 3.3 | 0.4 | 23 | 65 | 1300 | 110 | 0.5 | 3.1 | 0.17 | 130 | 170 | 3 | ++ | ++ |
| CE 1 | 98 | 2.1 | 0.45 | 10 | 65 | 10,000 | 80 | | | 0.17 | 160 | 170 | 1.5 | – | – |
| CE 2 | 110 | 1 | 0.45 | 65 | 65 | 80 | 80 | | | 0.17 | 130 | 170 | 2.8 | – | – |
| CE 3 | 100 | 2 | 0.45 | 25 | 37 | 1200 | 150 | | | 0.17 | 160 | 190 | 1.5 | – | – |
| CE 4 | 115 | 0.97 | >2 | 70 | 20 | 50 | >5000 | | | | | | 12 | – | – |

Key to winding performance, handling properties and processing performance of films:
++: no tendency to adhere to rolls or to other mechanical parts, no blocking problems on winding or during processing on packaging machinery, low production costs
+: average production costs
–: tendency to adhere to rolls or other mechanical parts, blocking problems on winding and during processing on packaging machinery, high production costs due to complicated handling of film in machinery

What is claimed is:

1. A coextruded, biaxially oriented, sealable polyester film with at least a base layer (B), with a sealable outer layer (A) arranged on outside of the base layer (B) and with another outer layer (C) arranged on the other side of the base layer (B), where the sealable outer layer (A) has a minimum sealing temperature of not more than about 110° C. and a seal seam strength of at least about 1.3 N/15 mm of film width, wherein the sealable outer layer (A) has an average surface roughness, expressed as $R_a$, of ≦40 nm, and has a value measured for gas flow within the range from about 300 to about 4000 s, wherein the nonsealable outer layer (C) has a coefficient of friction COF of ≦0.5, an average surface roughness, expressed as $R_a$, within the range of $40 \leq R_a \leq 150$ nm, and a value measured for gas flow of ≦140 s, and wherein, for the nonsealable outer layer (C), the number of elevations $N_c$ per mm² of film surface is correlated with their respective heights h via the following equations:

$$A_{C1} - B_{C1} \cdot \log h/\mu m < \log N_C/mm^2 < A_{C2} - B_{C2} \cdot \log h/\mu m$$

where $$0.01 \; \mu m \leq h \leq 10 \; \mu m$$

and $A_{C1}=0.29$, $B_{C1}=3.30$
and $A_{C2}=1.84$, $B_{C2}=2.70$.

2. The sealable polyester film as claimed in claim 1, wherein the sealable outer layer (A) comprises an amorphous copolyester composed of ethylene terephthalate units and of ethylene isophthalate units and of ethylene glycol units.

3. The sealable polyester film as claimed in claim 1, wherein the amorphous copolyester of the sealable outer layer (A) comprises from about 40 to about 95 mol % of ethylene terephthalate and from about 60 to about 5 mol % of ethylene isophthalate.

4. The sealable polyester film as claimed in claim 1, wherein the sealable outer layer (A) has a thickness in the range from about 0.2 to about 3 $\mu$m.

5. The sealable polyester film as claimed in claim 1, which comprises antiblocking agents selected from the group consisting of inorganic and organic particles and mixtures of these.

6. The sealable polyester film as claimed in claim 5, which comprises, as antiblocking agent, particles with an average primary particle diameter below about 100 nm, measured by the sedigraph method, or particles with an average primary particle diameter greater than or equal to about 1 $\mu$m, or particles with an average primary particle diameter below about 100 nm measured by the sedigraph method and particles with an average primary particle diameter ≧ about 1 $\mu$m.

7. The sealable polyester film as claimed in claim 6, wherein the amount of particles in the base layer (B) is within the range from about 0 to about 0.15% by weight, wherein the amount of particles in the nonsealable outer layer (C) is within the range from about 0.1 to about 1.0% by weight, and wherein the sealable outer layer (A) has an amount of particles within the range from about 0.01 to about 0.2% by weight, all data being based on % by weight and on the total weight of the respective layer.

8. The sealable polyester film as claimed in claim 1, wherein the thicknesses of the outer layers (A) and (C) are greater than about 0.1 $\mu$m, the thicknesses of the outer layers (A) and (C) being identical or different.

9. The sealable polyester film as claimed in claim 1, wherein the total thickness of the polyester film is within the range from about 3 to about 80 $\mu$m, the base layer (B) making up a proportion of from about 5 to about 90% of the total thickness.

10. A process for producing a sealable polyester film as claimed in claim 1, in which the polymers for the base layer (B) and the two outer layers (A) and (C) are fed to separate extruders, the melts are then coextruded through a coextrusion die to give a flat melt film and then the film is drawn off with the aid of a chill roll and solidified, and then biaxially stretch-oriented and heat-set, and then, where appropriate, corona- or flame-treated on at least one surface, which process comprises carrying out the biaxial stretching in succession, first stretching longitudinally (in the machine direction) and then transversely (perpendicularly to the machine direction), carrying out the longitudinal stretching at a temperature within the range from about 80 to about 130° C., and the transverse stretching within the range from about 90 to about 150° C., and setting the longitudinal stretching ratio within the range from about 2.5:1 to about 6:1, and the transverse stretching ratio within the range from about 3.0:1 to about 5.0:1.

11. The process as claimed in claim 10, wherein one or both surfaces of the film are in-line coated after the longitudinal stretching and prior to the transverse stretching.

* * * * *